(12) United States Patent
Roumier et al.

(10) Patent No.: US 10,362,646 B2
(45) Date of Patent: Jul. 23, 2019

(54) HEAD LAMP LIGHTING SYSTEM OF A VEHICLE AND ITS CONTROL METHOD

(71) Applicant: Aptiv Technologies Limited, St. Michael (BB)

(72) Inventors: Cyril Roumier, Asnières sur Seine (FR); Cyril Icher, Montlignon (FR)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 16/207,108

(22) Filed: Dec. 1, 2018

(65) Prior Publication Data
US 2019/0191505 A1    Jun. 20, 2019

(30) Foreign Application Priority Data

Dec. 19, 2017  (EP) ..................... 17208494

(51) Int. Cl.
*B60Q 1/26*    (2006.01)
*B60Q 1/14*    (2006.01)
(Continued)

(52) U.S. Cl.
CPC ........ *H05B 33/0815* (2013.01); *F21S 41/151* (2018.01); *H02M 1/08* (2013.01);
(Continued)

(58) Field of Classification Search
CPC .... B60Q 3/0293; B60Q 11/005; B60Q 1/387; B60Q 1/2603; B60Q 3/048; B60Q 1/1415;
(Continued)

(56) References Cited

U.S. PATENT DOCUMENTS 9,820,343 B1 * 11/2017 Fragiacomo ............. B60Q 1/04
2006/0033442 A1    2/2006 D Angelo
(Continued)

FOREIGN PATENT DOCUMENTS

| EP | 2542030 A1 | 1/2013 |
|---|---|---|
| EP | 2782419 A1 | 9/2014 |
| WO | 2009/019634 A1 | 2/2009 |

*Primary Examiner* — Minh D A
(74) *Attorney, Agent, or Firm* — Lawrence D. Hazelton (57) ABSTRACT

A head lamp lighting system of a vehicle includes a DC/DC boost converter configured to provide a common boosted output voltage from a battery voltage, a plurality of DC/DC buck converters, each DC/DC buck converter being configured to provide an adjusted buck output current from the common boosted output voltage, a plurality of strings of Light-Emitting Diodes, each string of Light-Emitting Diodes being electrically connected to only one adjusted buck output current and vice versa, a main controller electrically connected to the DC/DC boost converter and configured to provide a boost switching frequency value to the DC/DC boost converter, a battery voltage supervisor electrically connected to the main controller and electrically connected to the battery voltage, said battery voltage supervisor being configured to provide the battery voltage value to the main controller; the main controller being configured to determine the boost switching frequency value according to the battery voltage value.

14 Claims, 5 Drawing Sheets

(51) Int. Cl.
  *H05B 33/08* (2006.01)
  *F21S 41/151* (2018.01)
  *H02M 3/156* (2006.01)
  *H02M 1/08* (2006.01)
  *H02M 1/00* (2006.01)
  *F21Y 115/10* (2016.01)

(52) U.S. Cl.
  CPC .......... *H02M 3/156* (2013.01); *H05B 33/089* (2013.01); *H05B 33/0824* (2013.01); *F21Y 2115/10* (2016.08); *H02M 2001/0009* (2013.01)

(58) Field of Classification Search
  CPC . B60Q 1/143; B60Q 1/44; B60Q 1/54; B60Q 2300/112; B60Q 1/1423; B60Q 9/001; B60Q 2300/314; B60Q 2300/42; F21V 23/02; F21V 25/12; H05B 37/0236; A63J 17/00; F21L 14/026
  See application file for complete search history.

(56) References Cited

U.S. PATENT DOCUMENTS

| | | |
|---|---|---|
| 2006/0164377 A1 | 7/2006 | Struebel et al. |
| 2009/0015178 A1 | 1/2009 | Liu |
| 2010/0164391 A1 | 7/2010 | Bea et al. |
| 2014/0252950 A1 | 9/2014 | Kikuchi et al. |
| 2016/0001699 A1 | 1/2016 | Krick et al. |
| 2018/0288839 A1* | 10/2018 | Safaee ................. H05B 33/083 |

* cited by examiner

HEAD LAMP LIGHTING SYSTEM OF A VEHICLE AND ITS CONTROL METHOD

TECHNICAL FIELD OF INVENTION

The present invention relates to head lamp lighting system of a vehicle and its control method. More particularly, the present invention relates to a head lamp lighting system comprising an enhanced control of a boost/buck voltage conversion.

BACKGROUND OF INVENTION

Recently, bulbs of head lamp lighting system of a vehicle have been replaced by strings of Light-Emitting Diodes (LEDs). LEDs for head lamp lighting system are generally high power LEDs in order to be used for high beam, low beam or other outside lighting functions of a vehicle. Generally, battery voltages of vehicles are not suitable as such for providing electrical power to said head lamp lighting system. Battery voltage of a vehicle is generally not stable as it may vary under operating conditions of the vehicle. Battery voltage level is also generally not suitable for high power LEDs.

It is known to use step-up converter for providing power supply to head lamp lighting device. However, said step-up converter generates heat and are generally not suitable for a wide diversity of LEDs functions as high beam, low beam, turn indicators, day running lights, fog lights, etc.

SUMMARY OF THE INVENTION

A head lamp lighting system of a vehicle comprises a DC/DC boost converter configured to provide a common boosted output voltage from a battery voltage; a plurality of DC/DC buck converters, each DC/DC buck converter configured to provide an adjusted buck output current from the common boosted output voltage; a plurality of strings of Light-Emitting Diodes; each string of Light-Emitting Diodes being electrically connected to only one adjusted buck output current and vice versa; a main controller electrically connected to the DC/DC boost converter and configured to provide a boost switching frequency value to the DC/DC boost converter; a battery voltage supervisor electrically connected to the main controller and electrically connected to the battery voltage, said battery voltage supervisor being configured to provide the battery voltage value to the main controller; the main controller being configured to determine the boost switching frequency value according to the battery voltage value.

The main controller may comprise a first predetermined table wherein a plurality of predetermined battery voltage values are associated with a plurality of predetermined boost switching frequency values, each predetermined battery voltage value being associated with only one predetermined boost switching frequency value and vice versa.

The main controller may be configured to determine the boost switching frequency value as being the predetermined boost switching frequency value of the first predetermined table associated to the nearest predetermined battery voltage value to the provided battery voltage value.

The plurality of predetermined boost switching frequency values may be predetermined such that with increasing predetermined battery voltage value the predetermined boost switching frequency value increases by means of steps.

The first predetermined table may comprise a predetermined minimum battery voltage value of 5 Volts associated with a minimum predetermined boost switching frequency, said predetermined minimum battery voltage value being representative to the minimum battery voltage value for operating the head lamp lighting system.

The first predetermined table may comprise a predetermined maximum battery voltage value of 25 Volts associated with a maximum predetermined boost switching frequency, said predetermined maximum battery voltage value being representative to the maximum battery voltage value for operating the head lamp lighting system.

The DC/DC boost converter may comprise a pulse-width modulation controller configured to provide a PWM signal at the determined boost switch frequency value to a switching element of the DC/DC boost converter.

The pulse-width modulation controller may comprise a peak current-mode PWM control loop configured to detect a predetermined peak current of an energy storage element of the DC/DC boost converter such that the duty cycle of the PWM signal is automatically adjusted according to the detection of the peak current of energy storage element.

The main controller may be electrically connected to each DC/DC buck converter, the main controller providing a plurality of buck switching frequency values to the plurality of DC/DC buck converters, each DC/DC buck converter being provided by only one buck switching frequency value and each buck switching frequency value being provided to only one DC/DC buck converter; each string of LEDs comprising a current drop sensor or a voltage drop sensor configured to measure a current drop value or voltage drop value over each string of LEDs, each sensor being electrically connected to the main controller and configured to provide a current drop value or a voltage drop value to the main controller; the main controller being configured to determine the buck switching frequency value of each DC/DC buck converter according to each current drop value or voltage drop value.

According to the invention, a method for controlling a head lamp lighting system as described above comprises the steps of: monitoring the battery voltage; determining a battery voltage value from the monitored battery voltage; determining a boost switching frequency value according to the battery voltage value; stepping-up the battery voltage up to a common boosted output voltage by means of the DC/DC boost converter operating at the determined boost switching frequency value; stepping-down the common boosted output voltage to a plurality of buck output voltages providing adjusted buck output currents; and powering each string of LEDs by only one adjusted buck output current, each adjusted buck output current providing power supply to only one string of LEDs.

The step of determining the boost switching frequency value may comprise the steps of: setting up a first predetermined table wherein a plurality of predetermined battery voltage values are associated with a plurality of boost switching frequency values, each predetermined battery voltage value being associated with only one predetermined boost switching frequency value and vice versa; determining the boost switching frequency value as being the predetermined boost switching frequency value of the first predetermined table associated to the nearest predetermined battery voltage value to the determined battery voltage value.

The step of setting up the first predetermined table may comprise a step of predetermining the plurality of boost switching frequency values such that with increasing predetermined battery voltage value the predetermined boost switching frequency value increases by means of steps.

The step of setting up the first predetermined table may comprises a step of setting a predetermined minimum battery voltage value of 5 Volts and a predetermined maximum battery voltage value of 25 Volts respectively associated with a predetermined minimum boost switching frequency value and a predetermined maximum boost switching frequency, said predetermined minimum battery voltage value of 5 Volts and the predetermined maximum battery voltage value of 25 Volts representative respectively to the minimum battery voltage value and the maximum battery voltage value for operating the head lamp lighting system.

The step of stepping-up the battery voltage up to the common boosted output voltage may comprises the step of controlling a switching element of the DC/DC boost converter by means of a Pulse Width Modulated signal at the determined boost switching frequency value.

The step of stepping-down the common boosted output voltage to a plurality of buck output voltages may comprise the steps of: monitoring a current drop or a voltage drop over each string of LEDs; determining a current drop value or a voltage drop value for each string of LEDs from the monitored current drop or a voltage drop; determining a buck switching frequency value for each DC/DC buck converter according to each current drop value or voltage drop value, and stepping-down the common boosted output voltage to the plurality of adjusted buck output currents by means of the plurality of DC/DC buck converter, each DC/DC buck converter operating at its determined buck switching frequency value.

BRIEF DESCRIPTION OF DRAWINGS

Other features, objects and advantages of the invention will become apparent from reading the detailed description that follows, and the attached drawings, given by way of example and in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
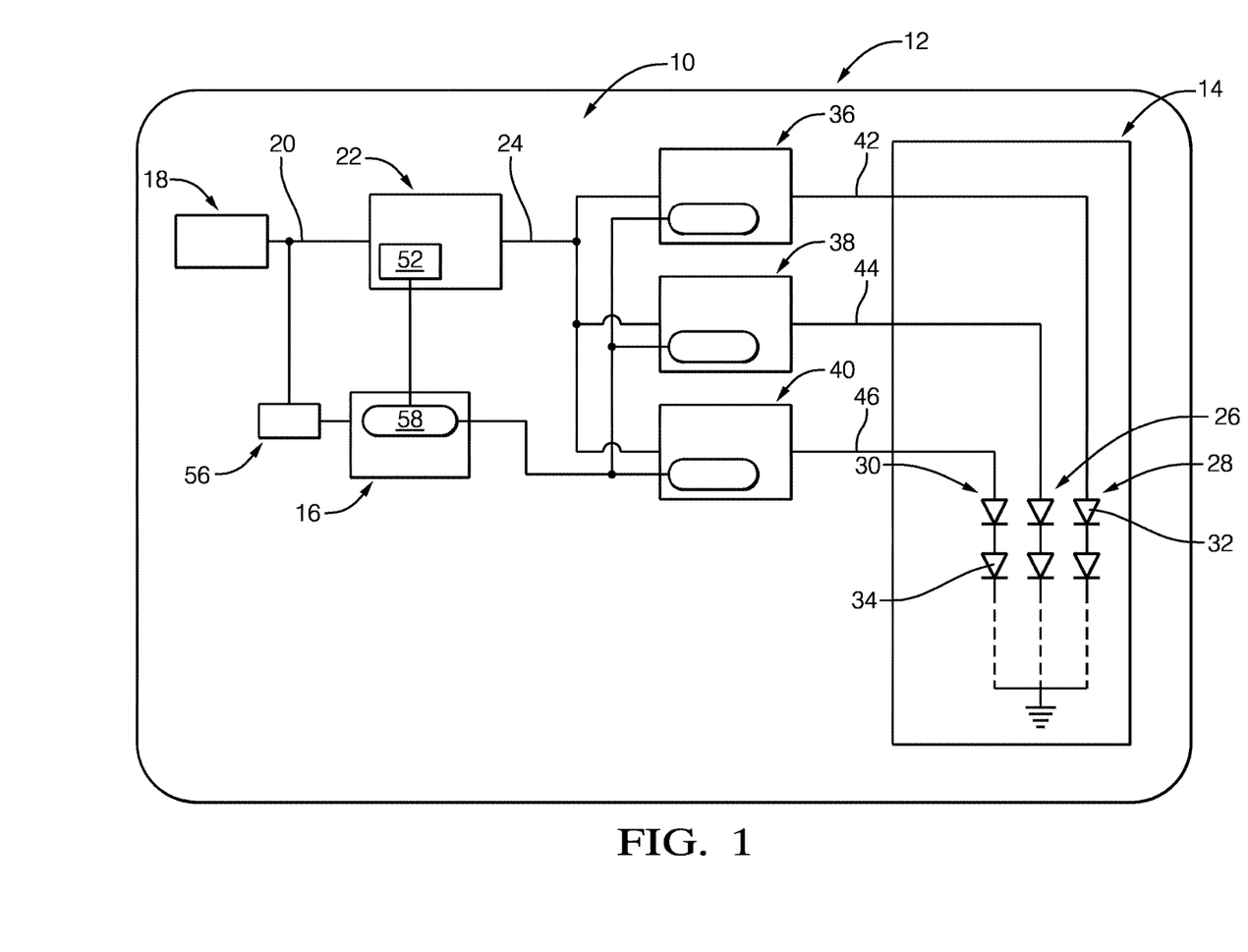
FIG. 1 is a schematic block diagram of a head lamp lighting system according to a first preferred embodiment.

FIG. 1 shows a head lamp lighting system 10 of a vehicle 12 comprising a voltage source 18, a step-up voltage converter named a direct current-to-direct current (DC/DC) boost converter 22, a main controller 16, three step-down voltage converters named three direct DC/DC buck converters 36, 38, 40, and a head lamp lighting device 14 comprising three strings 26, 28, 30 of Light-Emitting Diodes (LEDs) 32, 34.

The voltage source 18 provides a battery voltage 20 to the step-up voltage converter. According to the invention, the step-up voltage converter is a direct current-to-direct current (DC/DC) boost converter 22. The DC/DC boost converter 22 is electrically connected to the main controller 16 such that the main controller 16 provides at least a targeted common boosted output voltage value to the DC/DC boost converter 22. In the sense of the invention, a targeted common boosted output voltage value is the DC output voltage value that the DC/DC boost converter 22 is intended to provide or output. Said targeted common boosted output voltage value is a predetermined common output voltage value as being preliminary estimated for a dedicated application.

According to the targeted common boosted output voltage value and to the battery voltage value, the DC/DC boost converter 22 reaches a common boosted output voltage 24. The battery voltage 20 value is the level of the voltage of the voltage source 18 during the step-up conversion. The common boosted output voltage 24 is delivered as a common input voltage for the three DC/DC buck converter 36, 38, 40. The output voltage of each DC/DC buck converter 36, 38, 40, named the buck output voltage of each DC/DC buck converter 36, 38, 40, provides a power supply to only one string 30 of LEDs 32, 34 of the head lamp lighting device 14, each string 26, 28, 30 of LEDs 32, 34 being supplied by only one buck output voltage of one DC/DC buck converter 36, 38, 40. More particularly, each DC/DC buck converter is used as a current source for each string 26, 28, 30 of LEDs 32, 34. In other words, the output current of each DC/DC buck converter 36, 38, 40, named the buck output current 42, 44, 46 of each DC/DC buck converter 36, 38, 40, supplies only one string 30 of LEDs 32, 34 of the head lamp lighting device 14, each string 26, 28, 30 of LEDs 32, 34 being supplied by only one buck output current 42, 44, 46 of one DC/DC buck converter 36, 38, 40. According to a first preferred embodiment, the voltage source 18 is a battery of the vehicle 12 that provides the battery voltage 20. The battery voltage 20 may change over the times due to operating conditions. As a non-limiting example, for the vehicle 12 equipped with a thermal engine and equipped with a 12 Volt battery, under few operating conditions, the battery voltage 20 may vary from a battery voltage value of 5 Volts to a battery voltage value of 36 Volts. The lowest battery voltage value may occur during a very cold outside temperature and during a high need of current from the battery, as per non-limiting example, during a start or a restart (stop/start vehicle) of the thermal engine during hard winter. The highest battery voltage value may occur in a special condition, as per non-limiting example, wherein a booster start is used.

In order to provide a stabilized operating voltage for the head lamp lighting device 14, the DC/DC boost converter 22, elevates the battery voltage 20 up to the common boosted output voltage 24. In the sense of the invention, a stabilized operating voltage is a voltage that is substantially constant over the time.

Figure 2:
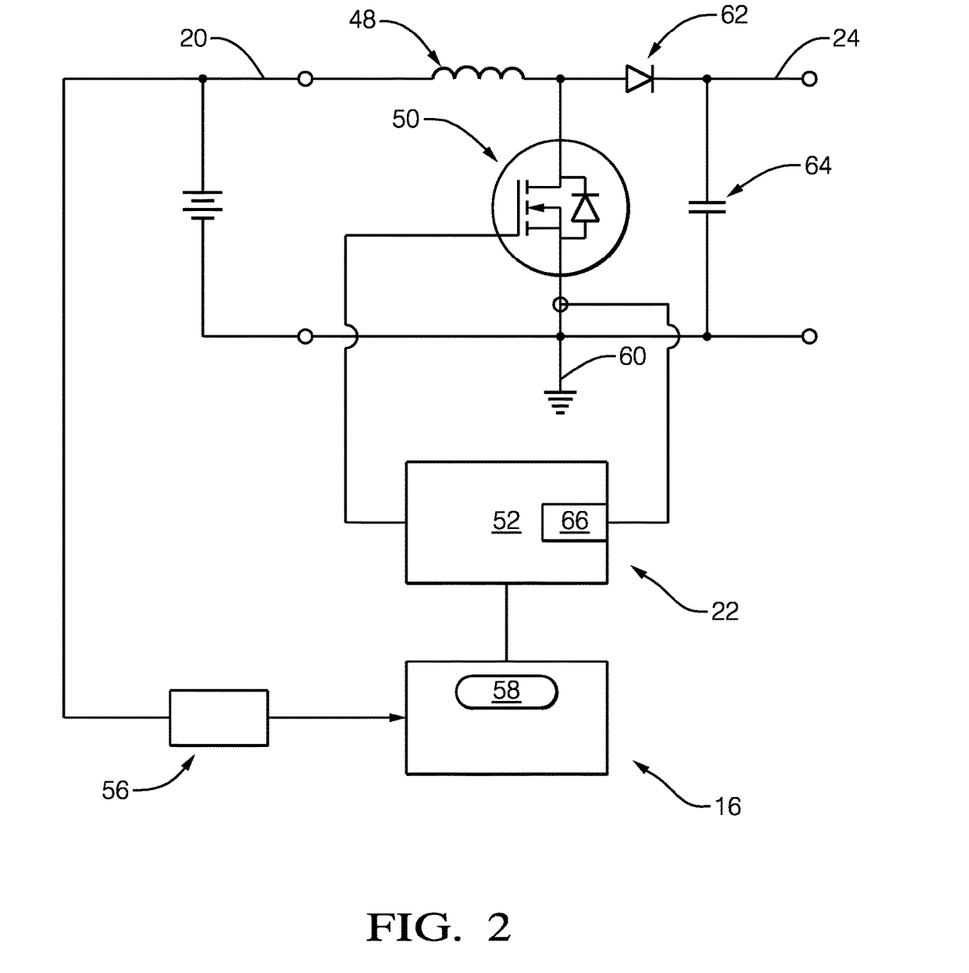
FIG. 2 shows a schematic diagram of the DC/DC boost converter of the first preferred embodiment controlled by the main controller.

According to FIG. 1 and FIG. 2, preferably, the DC/DC boost converter 22 is a switched-mode power supply comprising at least an energy storage element 48 configured to be switched by a switching element 50 such that energy can be charged and discharged from the energy storage element. The DC/DC boost converter 22 comprises a pulse-width modulation controller 52 configured to provide a Pulse Width Modulated (PWM) signal 54 for controlling the switching element 50 of the DC/DC boost converter 22. In the sense of the invention, the PWM signal 54 is a square wave having a periodic waveform comprising a high period and a low period. The PWM signal comprises a duty cycle as being the ratio of the high period to the total period (high period+low period) of the square wave.

Preferably, the pulse-width modulation (PWM) controller 52 is distinct from the main controller 16 such that the main controller 16 does not support the constraint of generating high speed signal such as the PWM signal 54. Said advantage is important for avoiding too much heat generation from the main controller 16. Generally, the duty cycle of the PWM signal 54 is set according to the targeted common boosted output voltage 24. Generally, the frequency of the PWM signal 54, named in the present invention the boost switching frequency, is chosen for getting the best efficiency of the energy conversion according to the energy storage element 48 electrical characteristics and the switching element 50 electrical characteristics. The efficiency of the energy conversion of a voltage converter is generally defined as the ratio between the output power of the voltage converter and the input power of the voltage convertor.

For flexibility of the head lamp lighting system 10 design, the main microcontroller 16 is electrically connected to the DC/DC boost converter 22 such that said main controller 16 is able to provide the targeted common boosted output voltage value and the boost switching frequency value to the DC/DC boost converter 22.

One problem that the invention intends to resolve is to provide a power supply to head lamp lighting devices 14 that comprise strings 26, 28, 30 of LEDs 32, 34 of various functions that need various input voltages. Some functions need input voltage that is much greater that the battery voltage or less than the battery voltage. Particularly, some functions may need input voltage less than the battery voltage under some operating conditions of the battery or greater than the battery voltage under some other operating conditions.

As non-limiting example, the head lamp lighting device 14 may comprise strings 26, 28, 30 of LEDs 32, 34 for high beam function, low beam function and turn indicators. It may be understood that other lighting functions as 'day running lights', fog lights, etc. . . . may also be part of the invention. It has also to be understood that the invention is not limited to only three strings 26, 28, 30 of LEDs 32, 34 and three DC/DC buck converters 36, 38, 40. At least two strings of LEDs 26, 28 and two DC/DC buck converters 36, 38 may be also part of the invention.

According to the invention, the common boosted output voltage 24 is set at a value much greater than the highest needed input voltage of the strings of LEDs. Preferably, the common boosted output voltage 24 is also set at a value greater than the possible highest battery voltage 20.

Thus in order to adjust the power supply level of each string 26, 28, 30 of LEDs 32, 34 the common boosted output voltage 24 is used as an input voltage for the three DC/DC buck converters 36, 38, 40. Each DC/DC buck converter 36, 38, 40 is configured to deliver the adjusted buck output current 42, 44, 46 to its associated string 26, 28, 30 of LEDs 32, 34. In other words, each string 26, 28, 30 of LEDs 32, 34 is electrically connected to only one adjusted buck output current 42, 44, 46 and vice versa.

According to the first preferred embodiment, and as a difference from the state of the art, the boost switching frequency of our invention is adjusted according to the battery voltage value. Thus, the head lamp lighting system 10 of the vehicle 12 further comprises a battery voltage supervisor 56. The battery voltage supervisor 56 is electrically connected to the main controller 16 and electrically connected to the battery voltage 20. The battery voltage supervisor 56 is configured to monitor the battery voltage 20 and is configured to provide the battery voltage value to the main controller 16. According to the battery voltage value, the main controller 16 is able to determine the boost switching frequency value. According to the first preferred embodiment, the battery voltage supervisor 56 may be a standalone electronic device or it may be integrated inside the main controller 16. The battery voltage supervisor 56 may be an analog to digital converter.

The adjustment of the boost switching frequency according to the input voltage is one solution to optimize the efficiency of the DC/DC boost converter 22 thus it is a way to minimize the heat generation from the DC/DC boost converter 22. The efficiency of the DC/DC boost converter 22 is a balance between the ripple on the non-filtered output voltage of the DC/DC boost converter 22 and the switching losses over the switching element 50. More particularly, the efficiency of the DC/DC boost converter 22 is a balance between the duty cycle of the PWM signal 54 and the boost frequency of the PWM signal 54.

The determination of the boost switching frequency value according to the battery voltage value is executed by the main controller 16. The choice of monitoring the battery voltage by the main controller 16 via the battery voltage supervisor 56 and determining the boost switching frequency value by means of the main controller 16 instead of using the pulse-width modulation controller 52 provides the advantage to let the pulse-width modulation controller 52 only focused on very high speed execution of task as generating the PWM signal 54 at the boost switching frequency value, while the main controller 16 executes the determination of the boost switching frequency value at a low speed execution. The low speed execution of the boost switching frequency value determination is then not a contributor of heat generation of the head lamp lighting system 10. As a non-limiting example, while the pulse-width modulation controller 52 may generate a few hundred kilohertz (kHz) signal, as 250 kHz, to provide the PWM signal 54, the main controller 16 may sample at a very low speed the battery voltage via the battery voltage supervisor, as every 100 milliseconds (ms), i.e. 10 Hz. As the goal of the adjustment of the boost switching frequency is to get an optimized DC/DC boost converter 22 efficiency such that heat generation of the DC/DC boost converter 22 is minimized, a reaction time of few hundred milliseconds is acceptable.

Several methods to determine the boost switching frequency value may be implemented in the main controller 16.

Calculation for determining the boost switching frequency according to the electrical parameters of the DC/DC boost converter 22 such as the electrical characteristics of the energy storage element 48, of the switching element 50, of the battery voltage value, of the targeted common boosted output voltage value and of the duty cycle of the PWM signal 54 may be considered as a first method.

Another method, wherein a first predetermined table 58 comprising a plurality of predetermined battery voltage values associated with a plurality of predetermined boost switching frequency values may be implemented inside the main controller 16. Each predetermined battery voltage value is associated with only one predetermined boost switching frequency value and vice versa. The boost switching frequency value is the predetermined boost switching frequency value of the first predetermined table 58 associated to the nearest predetermined battery voltage value to the provided battery voltage value from the battery voltage supervisor 56. The plurality of predetermined boost switching frequency values may be preliminary measured by experience or resulting from a model based simulation of the DC/DC boost converter 22 and then filled in the first predetermined table 58. The objective of the determination of the boost switching frequency value versus the battery voltage value is to get the best efficiency of the DC/DC boost converter 22.

According to FIG. 2, the DC/DC boost converter 22 is controlled by the main controller 16. The represented electrical topology of the DC/DC boost converter 22 is a general well known topology wherein the battery voltage is applied on one pole of the energy storage element 48, such as a fix coil comprising a predetermined inductance value. The other pole of the energy storage element 48 is electrically connected to the switching element 50, such as a Metal Oxide Semiconductor Field Effect Transistor (MOSFET), said switching element 50 being controlled by the pulse-width modulation controller 52. The switching element 50 periodically switches the energy storage element 48 to the electrical ground 60. An additional switching element 62, such as a diode, is connected to the other pole of the energy storage element 48. The anode of the diode 62 is electrically connected to the other pole of the energy storage element 48 and the cathode of the diode 62 is the electrical point of the common boosted output voltage 24. One capacitor 64 is electrical connected between the cathode of the diode 62 and the electrical ground 60 such that the capacitor 64 is used as a filter to reduce voltage ripple.

Preferably, according to the first preferred embodiment, the pulse-width modulation controller 52 comprises a peak current-mode PWM control loop 66 configured to detect a predetermined peak current of the energy storage element 48 of the DC/DC boost converter 22 such that the PWM duty cycle is automatically adjusted according to the detection of the peak current of energy storage element 48.

It is noted that for such electrical topology, the duty cycle of the PWM signal 54 is directly derived from the battery voltage value and the targeted common boosted output voltage value. The duty cycle can be calculated by using the formula (Eq. 1) wherein D stands for the duty cycle, Vin stands for the battery voltage value and Vout stands for the targeted common boosted output voltage value:

$$D = 1 - Vin/Vout. \quad \text{Eq. 1}$$

Thus, for a predetermined common boosted output voltage value, the duty cycle increases when battery voltage value reduces.

It has also to be noted that the ripple of the common boosted output voltage 24 of the DC/DC boost converter 22 is proportional to the variation of the electrical current flowing within the energy storage element 48. The variation of the electrical current ΔI can be calculated according to the formula (Eq. 2) wherein Vin stands for the battery voltage value and Ton stands for the 'On' time of the PWM signal 54, and L stand for a fixed inductance value of the energy storage element 48:

$$\Delta I = (Vin \times Ton)/L. \quad \text{Eq. 2}$$

Thus, it is noted that the variation of the electrical current ΔI is a balance between the battery voltage value and the 'On' time of the PWM signal 54. 'On' time of the PWM signal 54 corresponds to or is indicative of the duration of the high period of the PWM signal 54. During the 'on' time, the switching element 50 electrically connects the energy storage element 48 to the electrical ground 60. During the low period of the PWM signal 54, the switching element 50 is in an open mode, such that the energy storage element 48 is not any more connected to the electrical ground 60.

For a predetermined boost switching frequency value of the PWM signal 54, it is noted that the variation of the electrical current ΔI depends only on the battery voltage value, said 'On' time of the PWM signal 54 being dependent on the duty cycle which is also dependent on the battery voltage (see equation 1). Finally, it is noted that for a predetermined boost switching frequency value of the PWM signal 54, the ripple on the common boosted output voltage 24 of the DC/DC boost converter 22 reduces when the battery voltage value reduces.

According to the electrical characteristics of the switching element 50 as a MOSFET transistor, it is noted that at a predetermined boost switching frequency value, the switching losses increase when battery voltage value decreases. It is also noted that the switching losses of the switching element 50 increase when the boost switching frequency value increases.

The above analysis is a basis for applying the above described method of the implementation of the first predetermined table 58 within the main controller 16 such that when battery voltage value varies, the main controller 16 provides the boost switching frequency value chosen from the first predetermined table 58.

Figure 3:
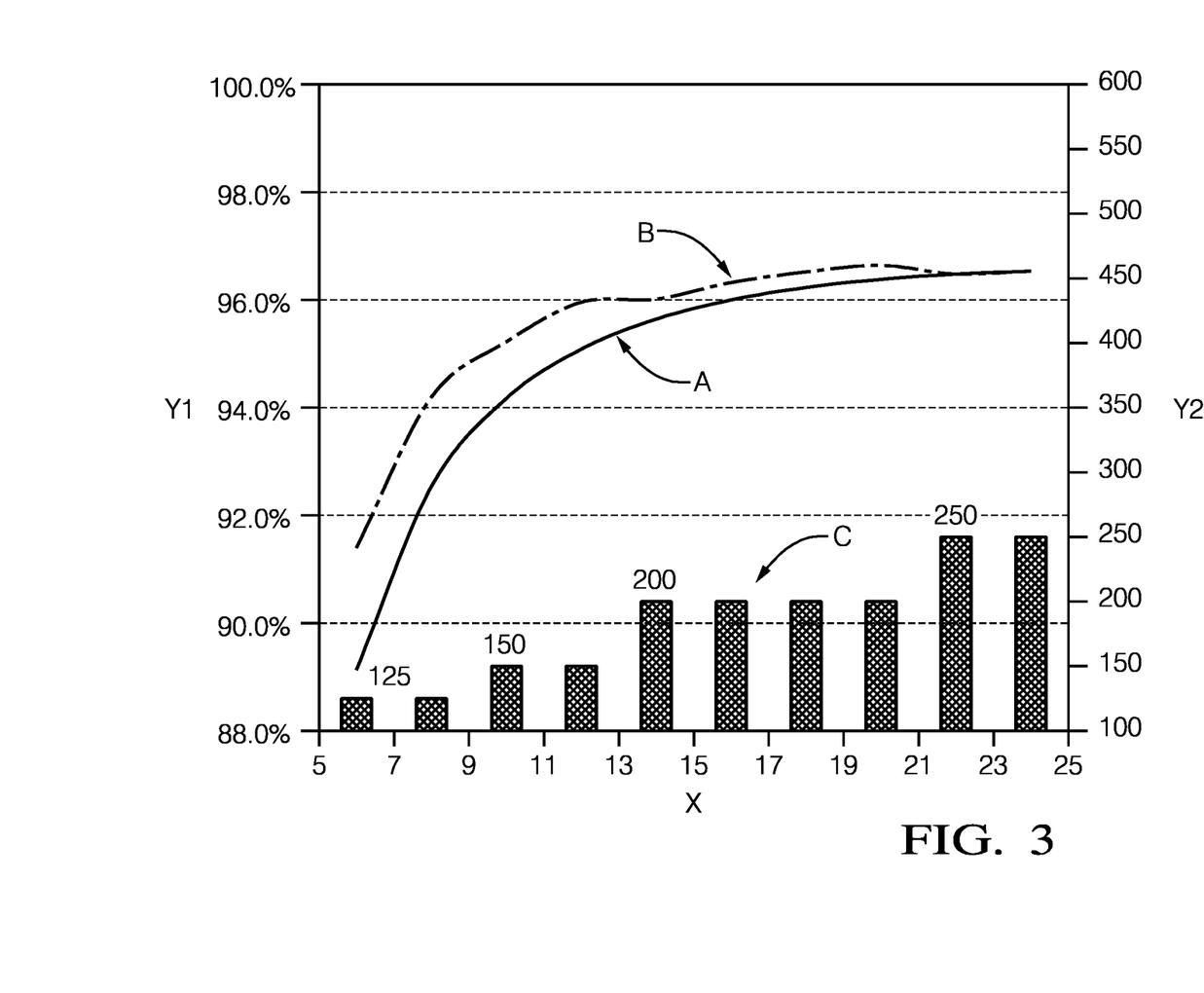
FIG. 3 is a graph comparing efficiency of DC/DC boost converter between prior art configuration and configuration according to the first preferred embodiment.

FIG. 3 shows a diagram highlighting the efficiency of the DC/DC boost converter 22 according to the variation of the battery voltage value and the boost switching frequency value. The X-axis represents the battery voltage value in Volt, said X axis starting at 5 Volts and ending at 25 Volts. As a non-limiting example, the 5 Volts and the 25 Volts are respectively battery voltage values representative to the minimum battery voltage value and to the maximum battery voltage value for operating the head lamp lighting system 10. The Y1-axis represents the efficiency in % as the ratio between the output power of the DC/DC boost converter 22 and the input power of the DC/DC boost converter 22. The Y2-axis represents the boost switching frequency values in kilohertz (kHz), said Y2-axis starting at 100 kHz and ending at 600 kHz.

Curve 'A' is the obtained efficiency of the DC/DC boost converter 22 wherein according to X-Axis, the battery voltage value varies from 5 to 25 Volts, and wherein the targeted output voltage value is 52 Volts for an output power of 40 Watts and wherein the boost switching frequency value does not dependent to the battery voltage. The boost switching frequency value is at a fixed boost switching frequency value of 250 kHz. Such configuration with a fixed boost switching frequency is a well know prior art configuration.

Curve 'B' is the obtained efficiency of the DC/DC boost converter 22 wherein same conditions as curve 'A' are applied, except that the boost switching frequency value varies. According to the bar graph 'C' in relation with the Y2-axis, curve 'B' is obtained by adjusted the boost switching frequency value by means of steps according to the battery voltages. As example, for battery voltage values less than 10 Volts, the boost switching frequency is adjusted to 125 kHz. For battery-voltage values greater than 20 Volts, the boost switching frequency is adjusted to 250 kHz. For battery voltage values from 10 Volts to 20 Volts, the boost switching frequency value increases by means of step from 150 kHz to 200 kHz.

Analysis of curve 'A' and curve 'B' demonstrates that the DC/DC boost converter 22 efficiency improves under the conditions of curve 'B' in comparison with curve 'A', i.e. wherein the boost switching frequency value is adjusted according to the battery voltage value.

More particularly, such diagram indicates that for an optimize DC/DC boost converter efficiency, the plurality of predetermined switching frequency values is predetermined such that with increasing predetermined battery voltage value the predetermined switching frequency value increases by means of steps.

It is noted that the predetermined boost switching frequency values may not be limited to the boost switching frequency values shown by the diagram of FIG. 3. Person skilled in the art would understand that such diagram of FIG. 3 demonstrates a trend of the relation between the battery voltage value and the boost switching frequency value, and that the order of the boost switching frequency values may be adjusted according to the characteristics of the electronic components of the DC/DC boost converter 22 as the switching element 50 and the energy storage element 48.

Figure 4:
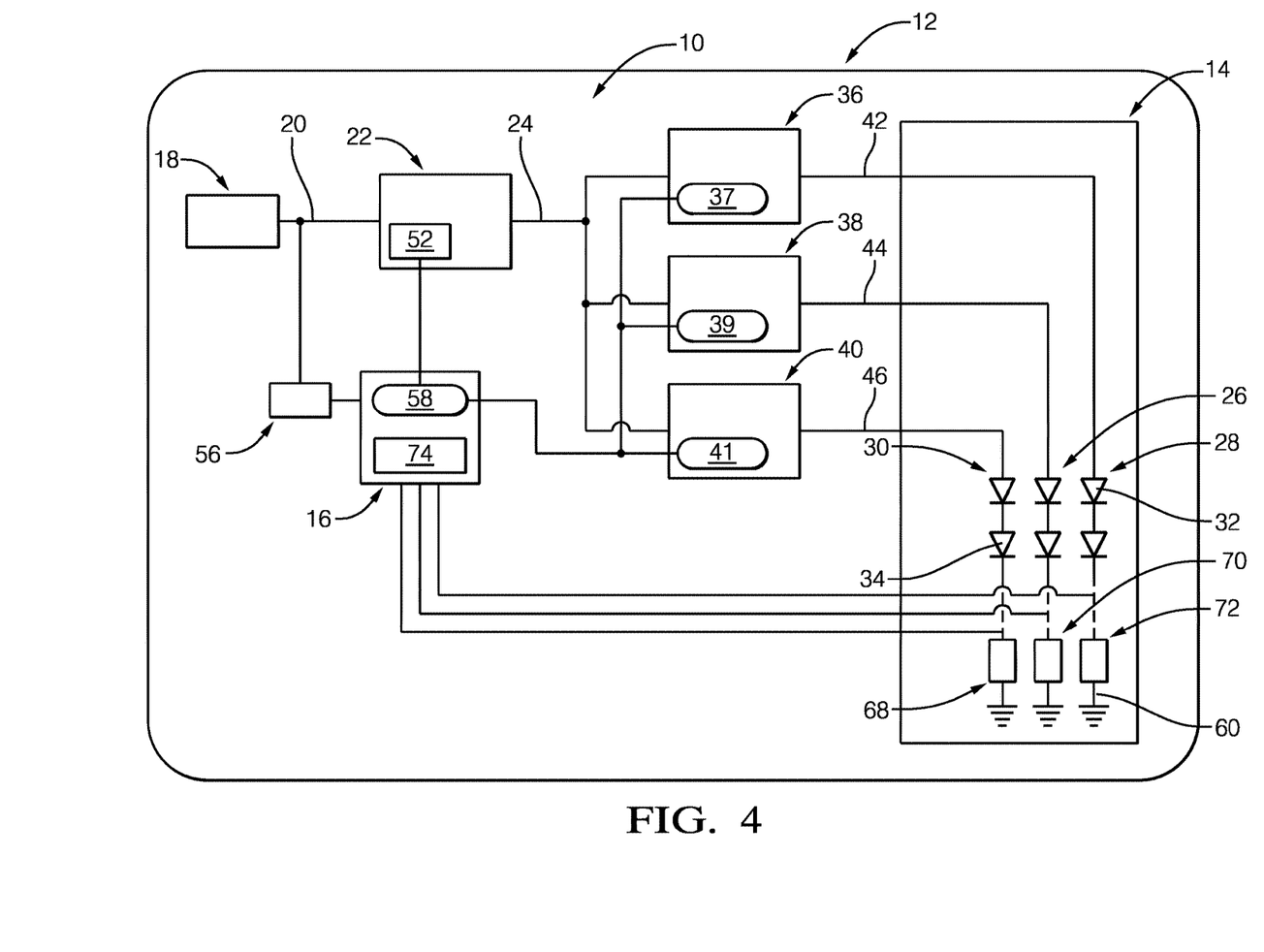
FIG. 4 is a schematic block diagram of the head lamp lighting system according to a refined and preferred embodiment.

FIG. 4 shows a further refined and preferred embodiment of the Head lamp lighting system 10 of the vehicle 12. The drawing shows similar components and reference numerals as before. The further refined and preferred embodiment further however includes three voltage drop sensors 68, 70, 72.

According to said further refined and preferred embodiment, each DC/DC buck converter 36, 38, 40 is another switched-mode power supply, each comprising at least another energy storage element configured to be switched by another switching element such that energy can be charged and discharged from the other energy storage element. Each DC/DC buck converter 36, 38, 40 comprises another pulse-width modulation controller 37, 39, 41 configured to provide another Pulse Width Modulated (PWM) signal for controlling the other switching element of each DC/DC buck converter 36, 38, 40.

Generally, the duty cycle of the each other PWM signal is set according to the adjusted buck output current 42, 44, 46. Generally, the frequency of each other PWM signal, named in the present invention the buck switching frequency, is chosen for getting the best efficiency of the energy conversion of each DC/DC buck converter 36, 38, 40 according to the other energy storage element characteristics and the other switching element characteristics.

Each voltage drop sensor 68, 70, 72 is configured to measure a voltage drop value over each string 26, 28, 30 of LEDs 32, 34, each voltage drop sensor 68, 70, 72 being electrically connected to the main controller 16 and configured to provide the voltage drop value of each string 26, 28, 30 of LEDs 32, 34 to the main controller 16. The main controller 16 is configured to determine the buck switching frequency value of each DC/DC buck converter 36, 38, 40 according to each voltage drop value. The main controller 16 is electrically connected to each DC/DC buck converter 36, 38, 40. The main controller is configured to provide a plurality of buck switching frequency values to the plurality of DC/DC buck converters 36, 38, 40, each DC/DC buck converter 36, 38, 40 being provided by only one buck switching frequency value and each buck switching frequency value being provided to only one DC/DC buck converter 36, 38, 40.

As non-limiting example, a voltage drop sensor 70 may be an electrical resistor placed on series with one string 26 of LEDs 32, 34, preferably between the electrical ground 60 and the end of the string 26 of LEDs 32, 34 opposite the end of said string 26 of LEDs 32, 34 electrically connected to the buck output courrent 44. The voltage over the electrical resistor, representative of the voltage of the string 26 of LEDs 32, 34, is then monitored by the main controller 16.

As an alternative, the voltage drop sensors 68, 70, 72 may be replaced by current drop sensors such that the main controller 16 is configured to determine the buck switching frequency value of each DC/DC buck converter 36, 38, 40 according to each current drop value. As non-limiting example, each current drop sensor may be a Hall Effect sensor placed on series with string 26 of LEDs 32, 34.

The advantage of said refined and preferred embodiment is that the adjusted buck output current 42, 44, 46 and the buck switching frequency of each buck converter 36, 38, 40 may be adjusted according to the voltage drop value or to the current drop value such that heat generation of each DC/DC buck converter 36, 38, 40 is minimize, i.e. efficiency of each DC/DC buck converter 36, 38, 40 is optimize. Current drop value or voltage drop value may vary under conditions as per example, operating temperature of the string of LEDs, or in case of LED 32, 34 failures. LED 32, 34 failures may be a LED 32, 34 in a short-circuit mode or in an open-circuit mode.

To determine each buck switching frequency value of each DC/DC buck converter 36, 38, 40, the main controller 16 comprises a second predetermined table 74 wherein a plurality of predetermined voltage drop values or predetermined current drop values are associated with a plurality of predetermined buck switching frequency values such that when voltage drop value or current drop value varies, the main controller 16 provides the buck switching frequency value chosen from the second predetermined table 74.

The mechanism of selecting the buck switching frequency value of each DC/DC buck converter 36, 38, 40 is similar as the mechanism described at the first embodiment about determining the boost switching frequency value of the DC/DC boost converter 22.

Model based simulation of DC/DC buck converter 36, 38, 40 and experimentation confirms that one way to get an optimized DC/DC buck converter efficiency is to predetermine the buck switching frequency values such that with increasing predetermined voltage drop value or predetermined current drop value, the predetermined buck switching frequency value increases by means of steps.

Figure 5:
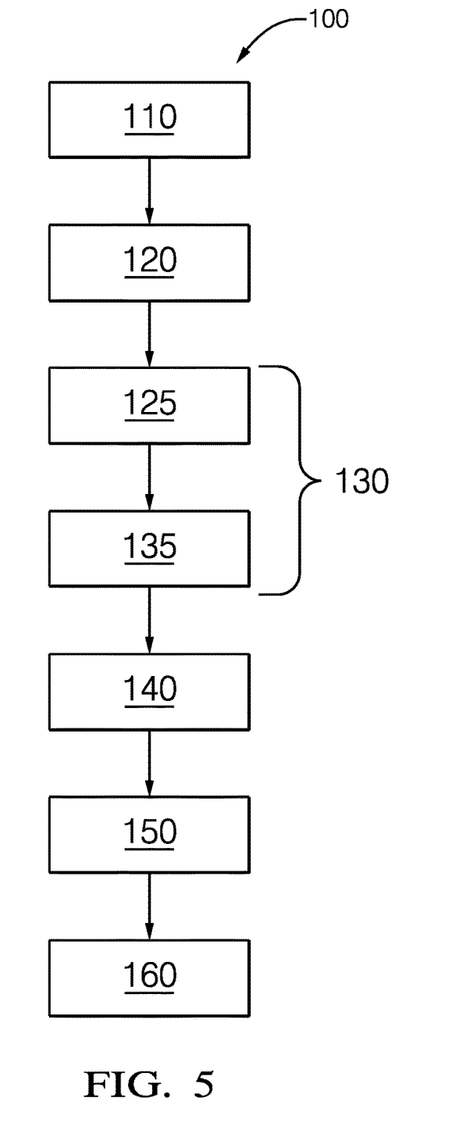
FIG. 5 is a flow chart diagram of a method for controlling the head lamp lighting system of FIG. 1.

FIG. 5 shows a method 100 for controlling a head lamp lighting system according to the first preferred embodiment. A first step comprises monitoring 110 the battery voltage 20 in order to determine 120 the battery voltage value as a second step. The battery voltage value is acquired by the main controller 16. As the battery voltage value may vary, such steps are periodically repeated, as per non-limiting example, every 100 ms. A third step comprises determining 130 a boost switching frequency value according to the battery voltage value. The boost switching frequency value is determined as providing the best efficiency of the DC/DC boost converter 22. Thus, a fourth step comprises stepping-up 140 the battery voltage 20 up to a common boosted output voltage 24 by means of the DC/DC boost converter 22 operating at the determined boost switching frequency value. Then in order to provide a power supply adjusted to each string 26, 28, 30 of LEDs 32, 34, a fifth step comprises stepping-down 150 the common boosted output voltage 24 to a plurality of buck output voltages providing a plurality of adjusted output currents 42, 44, 46 and finally, the last step comprises powering 160 each string 26, 28, 30 of LEDs 32, 34 by only one adjusted buck output current 42, 44, 46, each adjusted buck output current 42, 44, 46 providing power supply to only one string 26 of LEDs 32, 34.

According to the invention, preferably, the step of determining 130 the boost switching frequency value comprises a step of setting up 125 a first predetermined table 58 wherein a plurality of predetermined battery voltage values is associated with a plurality of boost switching frequency values, each predetermined battery voltage value being associated with only one predetermined boost switching frequency value and vice versa. Said first predetermined table 58 may be issue from a model based simulation of the DC/DC boost converter 22 or by calculation. Preferably, said first predetermined table is stored in a non-volatile memory of the main controller 16. Then the main controller 16 is able to execute the step of determining 135 the boost switching frequency value as being the predetermined boost switching frequency value of the first predetermined table 58 associated to the nearest predetermined battery voltage value to the determined battery voltage value.

From the diagram of FIG. 3, it has been concluded that, preferably, the step of setting up 125 the first predetermined table 58 comprises a step of predetermining the plurality of boost switching frequency values such that with increasing predetermined battery voltage value the predetermined boost switching frequency value increases by means of steps. In other words, filling the first predetermined table 58 results in that with increasing predetermined battery voltage value the predetermined boost switching frequency value increases by means of steps.

As a non-limiting example, the step of setting up 125 the first predetermined table 58 may comprise a step of setting a predetermined minimum battery voltage value of 5 Volts and a predetermined maximum battery voltage value of 25 Volts respectively associated with a predetermined minimum boost switching frequency value and a predetermined maximum boost switching frequency, said predetermined minimum battery voltage value of 5 Volts and the predetermined maximum battery voltage value of 25 Volts representative respectively to the minimum battery voltage value and the maximum battery voltage value for operating the head lamp lighting system 10.

The predetermined maximum output voltage value may be extended to 36 Volts in case of taking into account a booster start condition such that said 36 Volts predetermined battery voltage value is associated with another predetermined maximum boost switching frequency, the 25 Volts predetermined value being associated to a predetermined boost switching frequency less than or equal to said predetermined maximum boost switching frequency.

Preferably, the step of stepping-up 140 the battery voltage 20 up to a common boosted output voltage 24 comprises the steps of controlling the switching element 52 of the DC/DC boost converter 14 by means of Pulse Width Modulated PWM signal at the determined boost switching frequency value. The PWM signal 54 is preferably generated by a pulse-width modulation controller 52, distinct from the main controller 16, and generally being part of the DC/DC boost converter 22.

Figure 6:
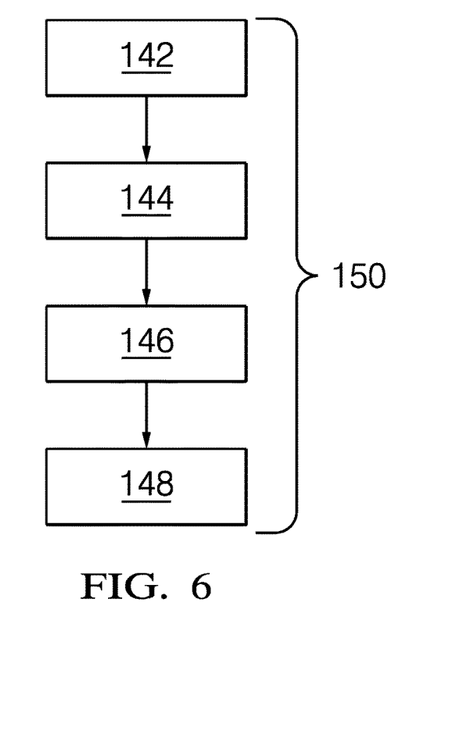
FIG. 6 is a flow chart diagram of additional steps of FIG. 5 for controlling the head lamp lighting system of FIG. 3.

FIG. 6 shows additional steps of the method of FIG. 5 such that the method 100 for controlling a head lamp lighting system 10 is applicable to the refined and preferred embodiment of the invention illustrate at FIG. 4.

More particularly, the step of stepping-down 150 the common boosted output voltage 24 to a plurality of buck output voltages comprises some additional steps. A first additional step comprises monitoring 142 a current drop or a voltage drop over each string 26, 28, 30 of LEDs 32, 34. Then a second additional step comprises determining 144 a current drop value or a voltage drop value for each string 26, 28, 30 of LEDs 32, 34 from the monitored current drop or a voltage drop. Such monitoring 142 step and determining 144 step are a way to diagnose each string of LEDs such that failures on a string of LEDs such that short circuit or open circuit may be detected. The consequence of such diagnostic is that the buck output current 42, 46, 48 of the string 26, 28, 30 of LEDs 32, 34 for which such failures occurred may be adjusted to optimize power consumption and heat generation. Thus a third additional step comprises determining 146 a buck switching frequency value for each DC/DC buck converter 36, 38, 40 according to each current drop value or voltage drop value and a fourth additional step comprises stepping-down 148 the common boosted output voltage 24 to the plurality of adjusted buck output currents 42, 44, 46 by means of the plurality of DC/DC buck converter 36, 38, 40, each DC/DC buck converter 36, 38, 40 operating at its determined buck switching frequency value.

While this invention has been described in terms of the preferred embodiments thereof, it is not intended to be so limited, but rather only to the extent set forth in the claims that follow.

We claim:

1. A head lamp lighting system (10) of a vehicle (12), said system comprising:
   a DC/DC boost converter (22) configured to provide a common boosted output voltage (24) from a battery voltage (20);
   a plurality of DC/DC buck converters (36, 38, 40), each of the plurality of DC/DC buck converters (36, 38, 40) configured to provide an adjusted buck output current (42, 44, 46) from the common boosted output voltage (24);
   a plurality of strings (26, 28, 30) of Light-Emitting Diodes (32, 34); each string (26, 28, 30) of Light-Emitting Diodes (32, 34) being electrically connected to the adjusted buck output current (42, 44, 46) of one of the plurality of DC/DC buck converters (36, 38, 40);
   a main controller (16) electrically connected to the DC/DC boost converter (22) and configured to provide a boost switching frequency value to the DC/DC boost converter (22);
   a battery voltage supervisor (56) electrically connected to the main controller (16) and electrically connected to the battery voltage (20), said battery voltage supervisor (56) being configured to provide the battery voltage value to the main controller (16); the main controller (16) being configured to determine the boost switching frequency value according to the battery voltage value.

2. The system (10) according to claim 1, wherein
   the main controller (16) comprises a first predetermined table (58) wherein a plurality of predetermined battery voltage values is associated with a plurality of predetermined boost switching frequency values, each predetermined battery voltage value being associated with only one predetermined boost switching frequency value and vice versa;
   said main controller (16) being configured to determine the boost switching frequency value as being the predetermined boost switching frequency value of the first predetermined table (58) associated to the nearest predetermined battery voltage value to the provided battery voltage value.

3. The system (10) according to claim 2 characterized in that the plurality of predetermined boost switching frequency values is predetermined such that with increasing predetermined battery voltage value the predetermined boost switching frequency value increases by means of steps.

4. The system (10) according to the claim 2 characterized in that the first predetermined table (58) comprises a predetermined minimum battery voltage value of 5 Volts associated with a minimum predetermined boost switching frequency, said predetermined minimum battery voltage value being representative to the minimum battery voltage value for operating the head lamp lighting system (10).

5. The system (10) according to the claim 2 characterized in that the first predetermined table (58) comprises a predetermined maximum battery voltage value of 25 Volts associated with a maximum predetermined boost switching frequency, said predetermined maximum battery voltage value being representative to the maximum battery voltage value for operating the head lamp lighting system (10).

6. The system (10) according to claim 1 characterized in that the DC/DC boost converter (22) comprises a pulse-width modulation controller (52) configured to provide a PWM signal (54) at the determined boost switch frequency value to a switching element (50) of the DC/DC boost converter (22).

7. The system (10) according to claim 6 characterized in that the pulse-width modulation controller (52) comprises a peak current-mode PWM control loop (66) configured to detect a predetermined peak current of an energy storage element (48) of the DC/DC boost converter (22) such that the duty cycle of the PWM signal (54) is automatically adjusted according to the detection of the peak current of energy storage element (48).

8. The system (10) according to claim 1 characterized in that
   the main controller (16) is electrically connected to each DC/DC buck converter (36, 38, 40), the main controller (16) providing a plurality of buck switching frequency values to the plurality of DC/DC buck converters (36, 38, 40), each DC/DC buck converter (36, 38, 40) being provided by only one buck switching frequency value and each buck switching frequency value being provided to only one DC/DC buck converter (36, 38, 40);
   each string (26, 28, 30) of LEDs (32, 34) comprises a current drop sensor or a voltage drop sensor (68, 70, 72) configured to measure a current drop value or voltage drop value over each string (26, 28, 30) of LEDs (32, 34), each sensor (68, 70, 72) being electrically connected to the main controller (16) and configured to provide a current drop value or a voltage drop value to the main controller (16); the main controller (16) being configured to determine the buck switching frequency value of each DC/DC buck converter (36, 38, 40) according to each current drop value or voltage drop value.

9. A method (100) for controlling a head lamp lighting system (10) of comprising the steps of:
   monitoring (110) the battery voltage (20);
   determining (120) a battery voltage value from the monitored battery voltage (20);
   determining (130) a boost switching frequency value according to the battery voltage value;
   stepping-up (140) the battery voltage (20) up to a common boosted output voltage (24) by means of the DC/DC boost converter (22) operating at the determined boost switching frequency value;
   stepping-down (150) the common boosted output voltage (24) to a plurality of buck output voltages providing adjusted buck output currents (42, 44, 46);
   powering (160) each string (26, 28, 30) of LEDs (32, 34) by only one adjusted buck output current (42, 44, 46); each adjusted buck output current (42, 44, 46) providing power supply to only one string (26) of LEDs (32, 34).

10. The method (100) according to claim 9 characterized in that the step of determining (130) the boost switching frequency value comprises the steps of:
    setting up (125) a first predetermined table (58) wherein a plurality of predetermined battery voltage values are associated with a plurality of boost switching frequency values, each predetermined battery voltage value being associated with only one predetermined boost switching frequency value and vice versa;
    determining (135) the boost switching frequency value as being the predetermined boost switching frequency value of the first predetermined table (58) associated to the nearest predetermined battery voltage value to the determined battery voltage value.

11. The method (100) according to claim 10 characterized in that the step of setting up (125) the first predetermined table (58) comprises a step of
predetermining the plurality of boost switching frequency values such that with increasing predetermined battery voltage value the predetermined boost switching frequency value increases by means of steps.

12. The method (100) according to claim 10 characterized in that the step of setting up (125) the first predetermined table (58) comprises a step of
setting a predetermined minimum battery voltage value of 5 Volts and a predetermined maximum battery voltage value of 25 Volts respectively associated with a predetermined minimum boost switching frequency value and a predetermined maximum boost switching frequency, said predetermined minimum battery voltage value of 5 Volts and the predetermined maximum battery voltage value of 25 Volts representative respectively to the minimum battery voltage value and the maximum battery voltage value for operating the head lamp lighting system (10).

13. The method (100) according to claim 9 characterized in that the step of stepping-up (140) the battery voltage (20) up to the common boosted output voltage (24) comprises the step of:
controlling a switching element (50) of the DC/DC boost converter (22) by means of a Pulse Width Modulated (PWM) signal (54) at the determined boost switching frequency value.

14. The method (100) according to claim 9 characterized in that the step of stepping-down (150) the common boosted output voltage (24) to a plurality of buck output voltages comprises the steps of:
monitoring (142) a current drop or a voltage drop over each string (26, 28, 30) of LEDs (32, 34);
determining (144) a current drop value or a voltage drop value for each string (26, 28, 30) of LEDs (32, 34) from the monitored current drop or a voltage drop;
determining (146) a buck switching frequency value for each DC/DC buck converter (36, 38, 40) according to each current drop value or voltage drop value;
stepping-down (148) the common boosted output voltage (24) to the plurality of adjusted buck output currents (42, 44, 46) by means of the plurality of DC/DC buck converter (36, 38, 40), each DC/DC buck converter (36, 38, 40) operating at its determined buck switching frequency value.

* * * * *